(12) United States Patent
Yu

(10) Patent No.: US 6,585,199 B1
(45) Date of Patent: Jul. 1, 2003

(54) MUSICAL INSTRUMENT STAND

(76) Inventor: Ming-Ti Yu, 122-5, Jun Liao Rd., Feng Yuan, Taichung Hsien (TW)

( * ) Notice: Subject to any disclaimer, the term of this patent is extended or adjusted under 35 U.S.C. 154(b) by 0 days.

(21) Appl. No.: 10/195,508

(22) Filed: Jul. 12, 2002

(51) Int. Cl.[7] ............................................... F16M 11/38
(52) U.S. Cl. .................................. 248/166; 248/163.1
(58) Field of Search ............................ 248/166, 163.1, 248/170, 440, 163.2, 431, 165, 434, 188.2

(56) References Cited

U.S. PATENT DOCUMENTS

| | | | | |
|---|---|---|---|---|
| 2,613,901 A | * | 10/1952 | Tatar | 248/167 |
| 4,015,806 A | * | 4/1977 | Cattermole | 248/168 |
| 4,223,860 A | * | 9/1980 | Prest | 248/171 |
| 4,988,064 A | * | 1/1991 | Hoshino | 248/170 |
| 5,044,507 A | * | 9/1991 | Shulyak | 211/203 |
| 5,320,316 A | * | 6/1994 | Baker | 248/163.1 |
| 5,713,547 A | * | 2/1998 | Yu | 248/166 |
| 5,876,011 A | * | 3/1999 | Blasing | 248/411 |
| 6,254,043 B1 | * | 7/2001 | Schwarzler | 248/163.1 |
| 6,412,742 B1 | * | 7/2002 | Yu | 248/434 |
| 6,439,532 B1 | * | 8/2002 | Yu | 248/443 |

FOREIGN PATENT DOCUMENTS

DE  2257355 A  *  1/1993  ........... F16M/11/34

* cited by examiner

Primary Examiner—Leslie A. Braun
Assistant Examiner—A. Joseph Wujciak

(57) ABSTRACT

A musical instrument stand has three pairs of first leg rods, three pairs of second leg rods, three link tubes, a positioning seat, three support tubes, three joints, a main pipe, and a clamping device. The main pipe passes through the clamping device. The positioning seat is disposed on a lower end of the main pipe. The support tubes are connected to the clamping device and the joints. Each joint is connected to one of the first leg rods and one of the second leg rods. Each link tube is connected to the positioning seat and one of the joints.

8 Claims, 9 Drawing Sheets

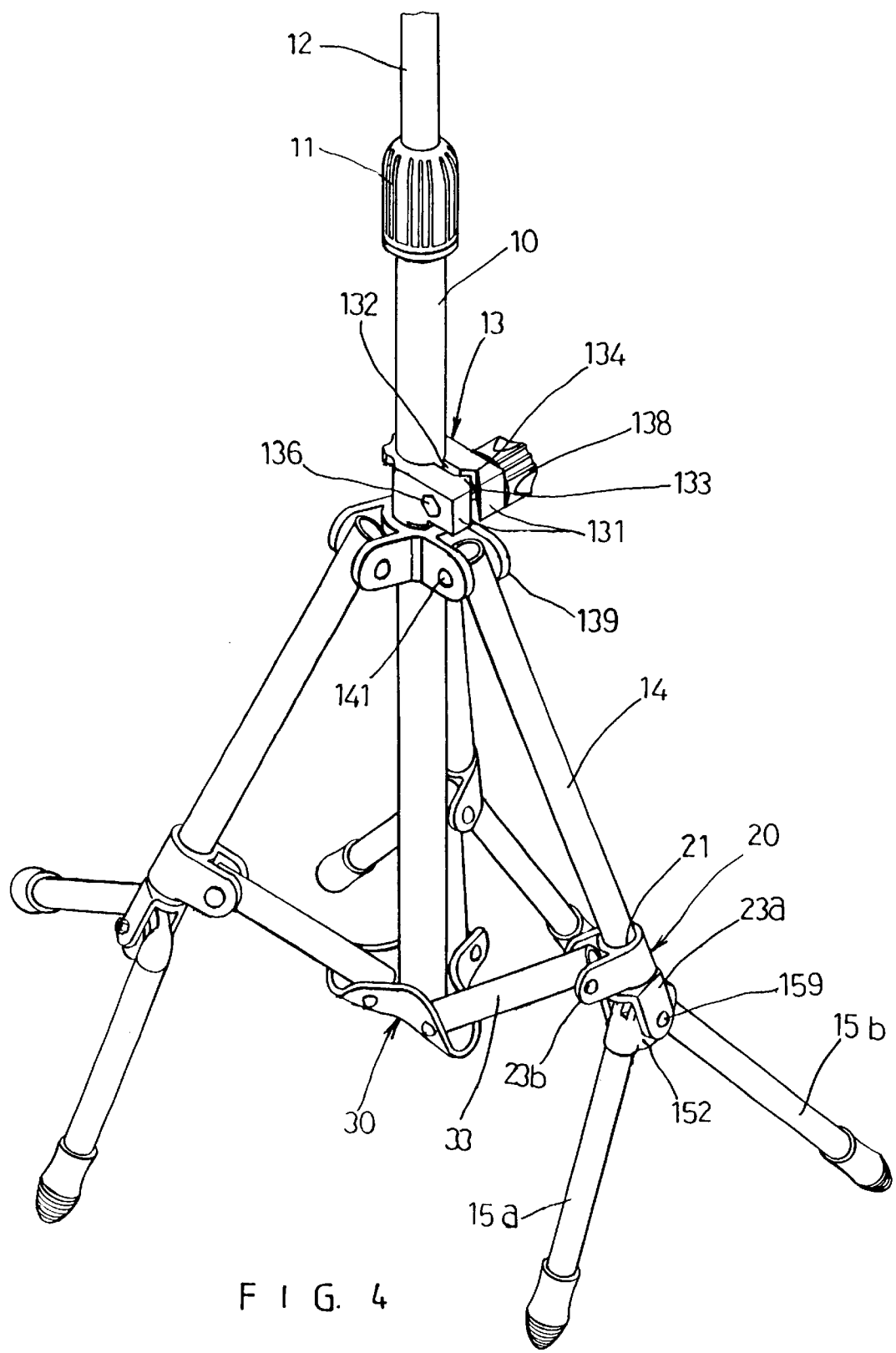
F I G. 4

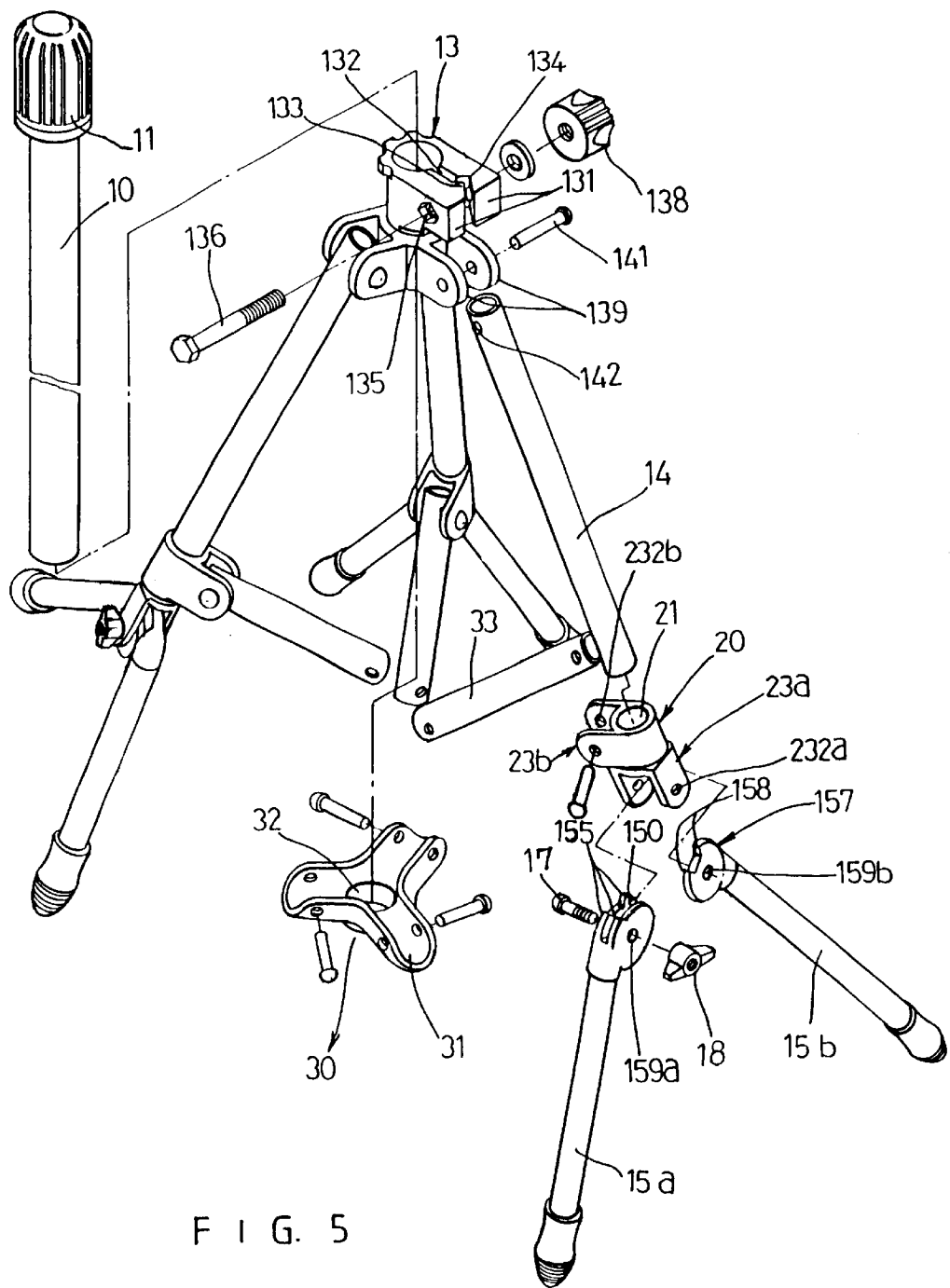
F I G. 5

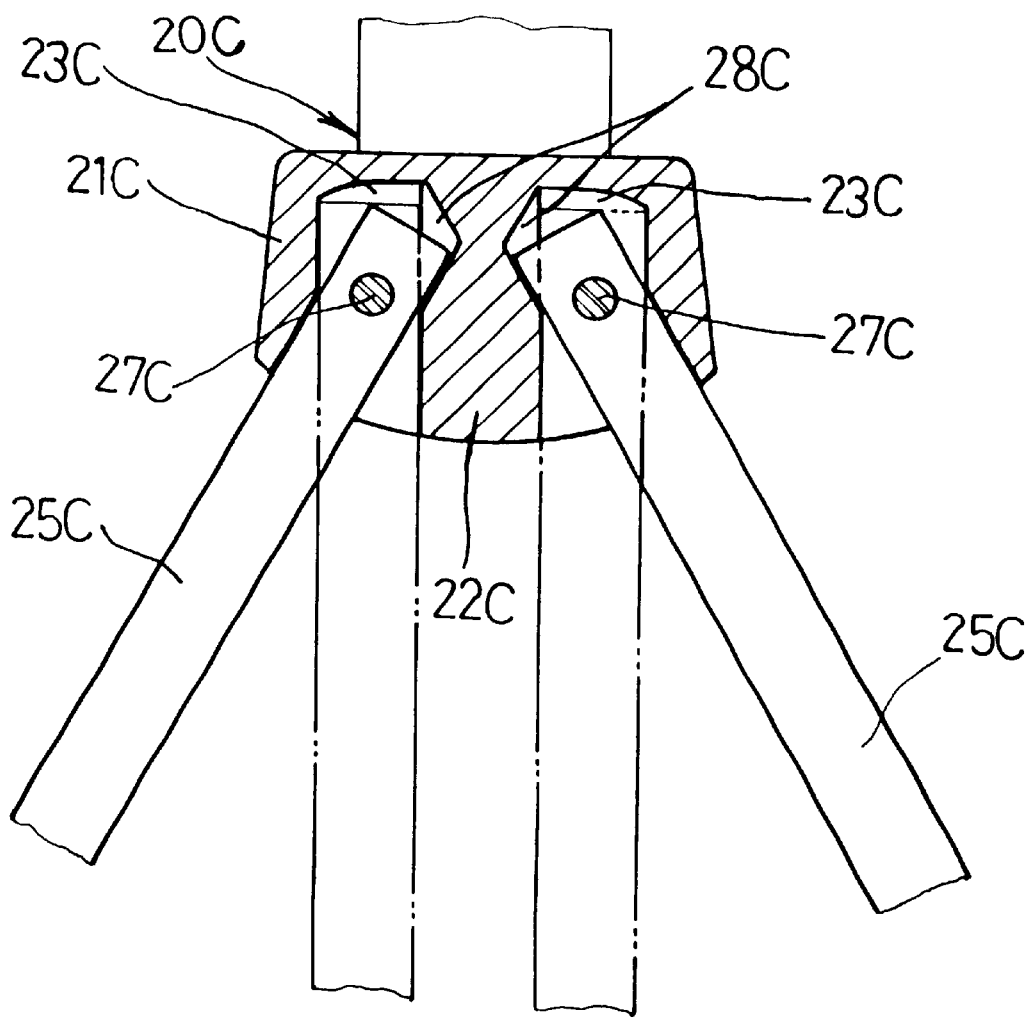
F I G. 7

MUSICAL INSTRUMENT STAND

BACKGROUND OF THE INVENTION

The present invention relates to a musical instrument stand. More particularly, the present invention relates to a musical instrument stand which can stand stably.

U.S. Pat. No. 5,713,547 has disclosed a guitar stand which has a main hollow rod, a first hollow leg, a second hollow leg, a first brace, a second brace, a first bracket, and a second bracket. A pivot means fastens the first hollow leg and the second hollow leg on the main hollow rod pivotally. A hollow upper block is disposed on top of the main hollow rod. The pivot means has a lobe, a transverse plate and a longitudinal plate which is disposed on top of the transverse plate. A main hollow rod has a lobe disposed on an upper portion of the main hollow rod. A circular hole and a curved hole are formed on the main hollow rod. A hollow upper block has a lower protrusion inserted in an upper end of the main hollow rod. A first and a second round cushions are disposed adjacent to a first and a second sides of the hollow upper block, respectively. The first round cushion has a first center hole. The second round cushion has a second center hole. A first bolt passes through the first center hole to fasten the first round cushion on the hollow upper block. A second bolt passes through the second center hole to fasten the second round cushion on the hollow upper block. A longitudinal plate is disposed on a top of the transverse plate. The longitudinal plate has an upper hole to match the corresponding circular hole and a lower hole to match the corresponding curved hole. A first fastening member passes through the circular hole and the upper hole and a second fastening member passes through the lower hole and the curved hole to fasten the lobe and the longitudinal plate together. A first and a second joints are disposed on the first and the second hollow legs, respectively. Each of the first and the second joints has a threaded lower portion inserted in a top interior of the corresponding hollow leg, an annular flange abutting the threaded lower portion, and a top recess to receive the transverse plate. A bevel is disposed beneath the top recess. A notch is formed on a top rim of the first hollow leg. A third and a fourth fastening members fasten the first and the second joints on the transverse plate. The first brace is fastened on a lower portion of the first hollow leg. The second brace is fastened on a lower portion of the second hollow leg. A first hook extends from a top end of the first bracket to be inserted in the first brace. A second hook extends from a top end of the second bracket to be inserted in the second brace. However, the hollow leg will be detached from the respective joint if the user extends the hollow leg to the utmost.

SUMMARY OF THE INVENTION

An object of the present invention is to provide a musical instrument stand which can stand stably.

Accordingly, a musical instrument stand comprises three pairs of first leg rods, three pairs of second leg rods, three link tubes, a positioning seat, three support tubes, three joints, a main pipe, a collar, and a clamping device. The collar is disposed on a top end of the main pipe. The main pipe passes through the clamping device. The positioning seat is disposed on a lower end of the main pipe. Each of the support tubes is connected to the clamping device and one of the joints. Each of the joints is connected to one of the first leg rods and one of the second leg rods. Each of the link tubes is connected to the positioning seat and one of the joints.

BRIEF DESCRIPTION OF THE DRAWINGS

FIG. 4 is a perspective assembly view of a musical instrument stand of a first preferred embodiment in accordance with the present invention;

FIG. 5 is a partially perspective exploded view of a musical instrument stand of a first preferred embodiment in accordance with the present invention;

FIG. 7 is a sectional assembly view of a lower block and a pair of leg rods.

DETAILED DESCRIPTION OF THE INVENTION

Figure 1:
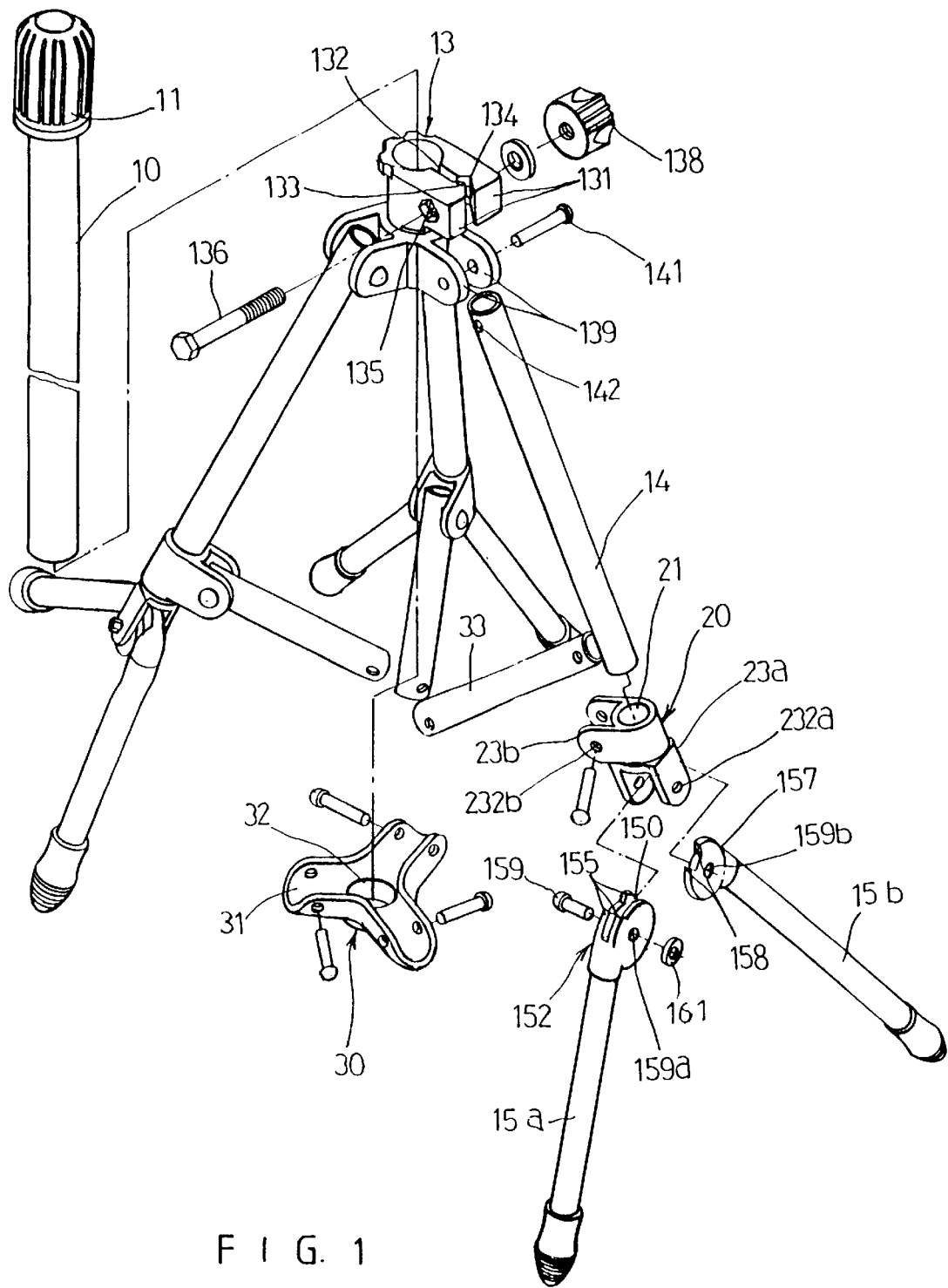
FIG. 1 is a perspective exploded view of a musical instrument stand of a first preferred embodiment in accordance with the present invention.
Figure 2:
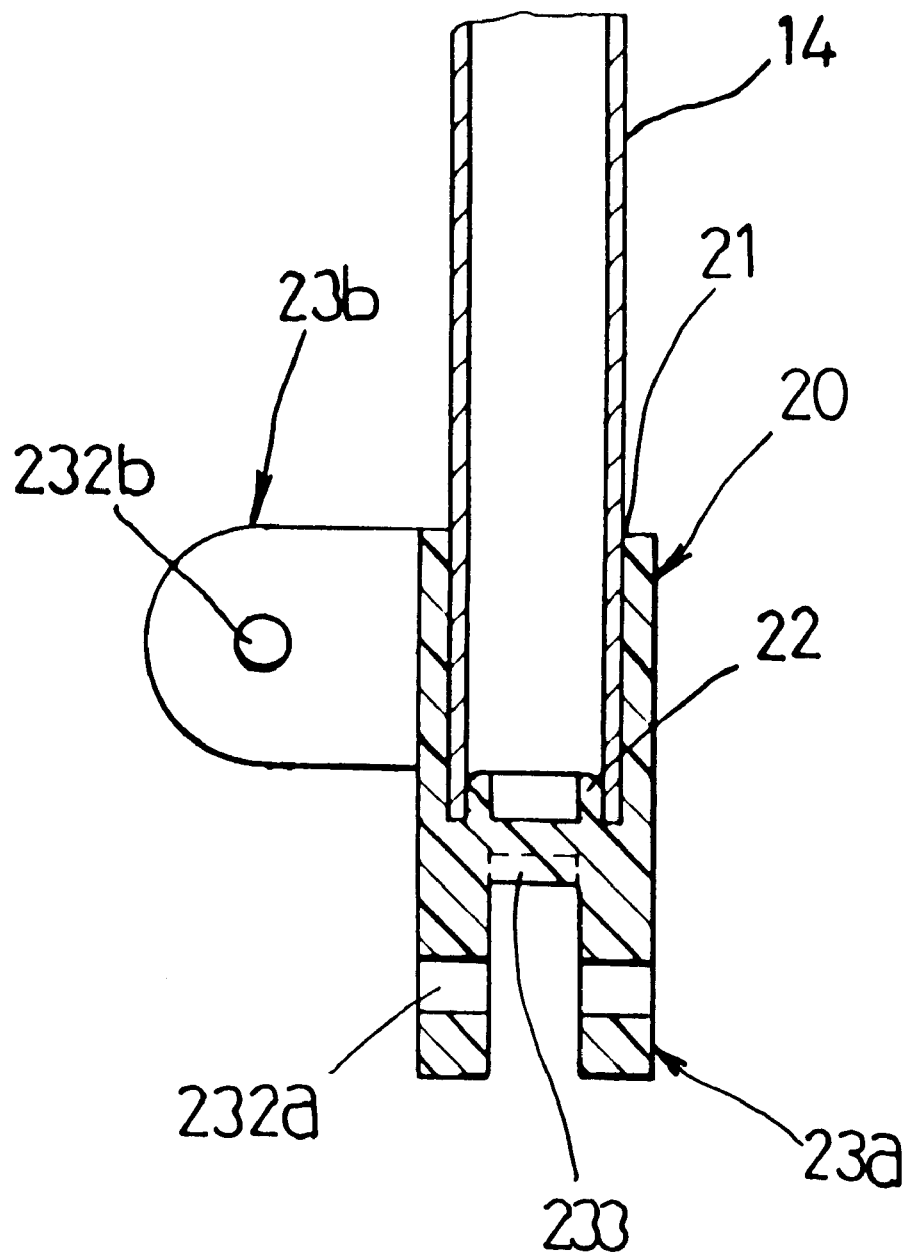
FIG. 2 is a sectional assembly view of a joint and a support tube.
Figure 3A:
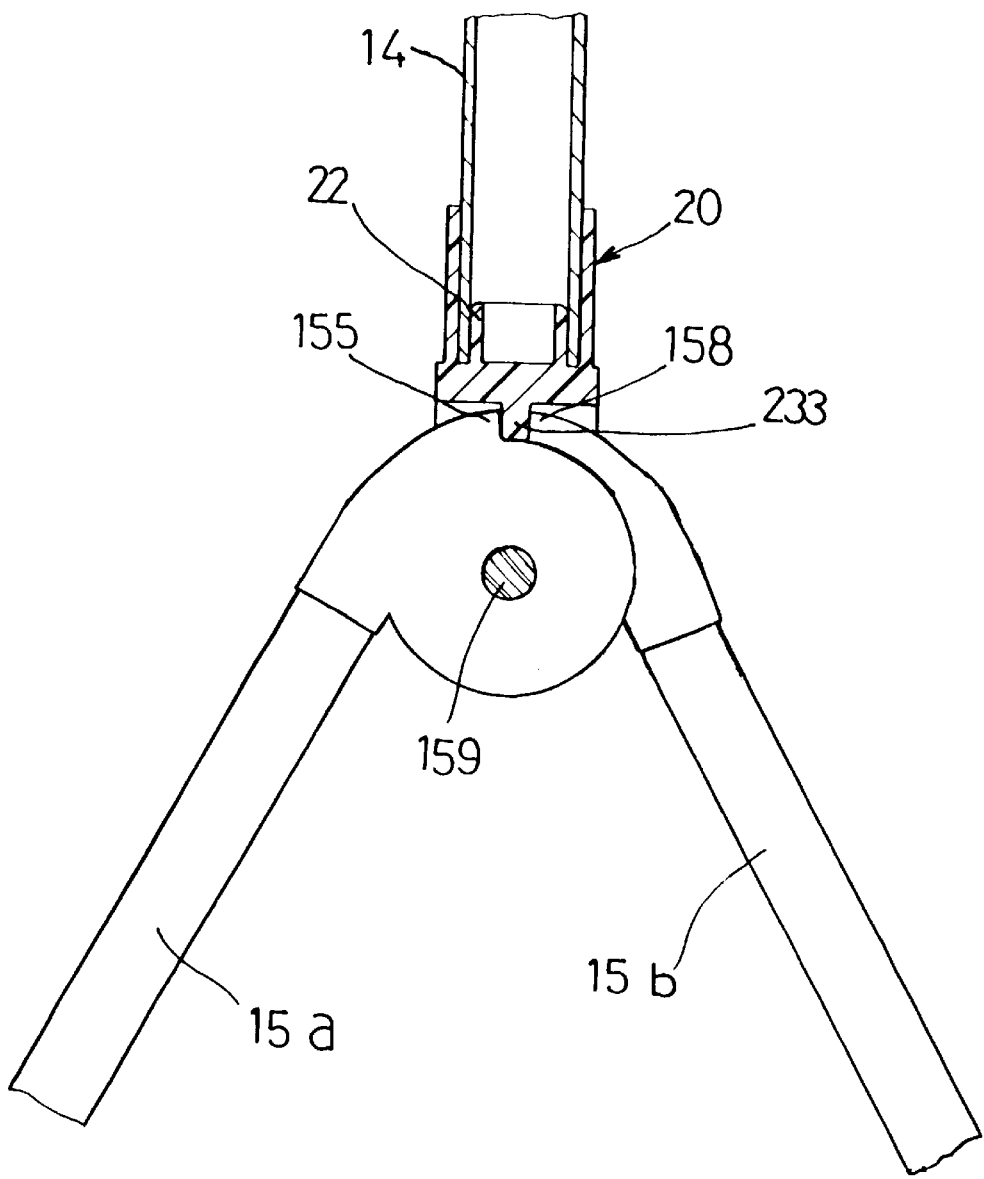
FIG. 3A is a sectional assembly view of a joint and a pair of leg rods while the leg rods are extended.
Figure 3B:
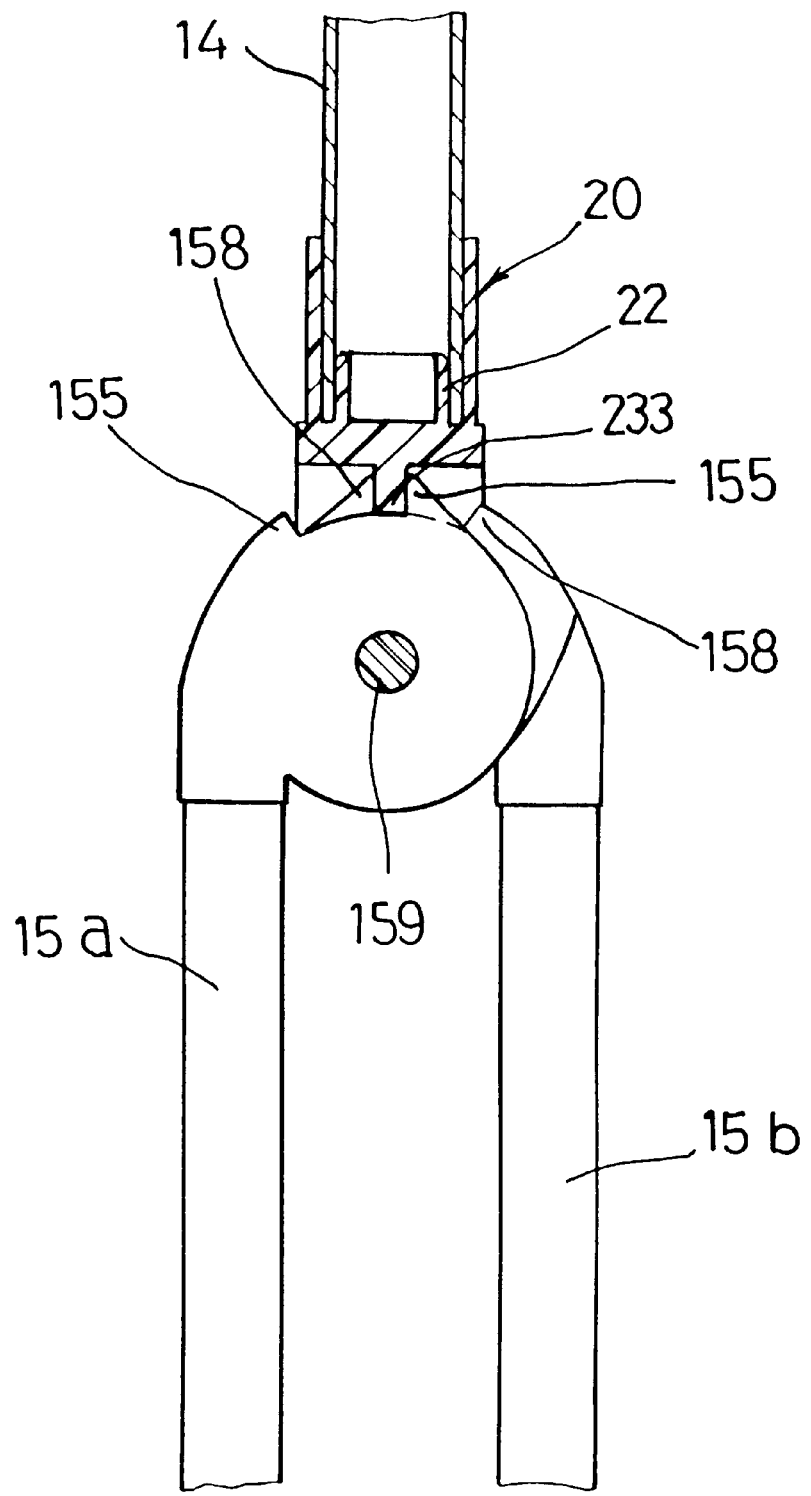
FIG. 3B is a sectional assembly view of a joint and a pair of leg rods while the leg rods are folded.

Referring to FIGS. 1 to 4, a first musical instrument stand comprises three pairs of first leg rods 15a, three pairs of second leg rods 15b, three link tubes 33, a positioning seat 30, three support tubes 14, three joints 20, a main pipe 10, a collar 11, and a clamping device 13.

The collar 11 is disposed on a top end of the main pipe 10.

The main pipe 10 passes through the clamping device 13.

The positioning seat 30 is disposed on a lower end of the main pipe 10.

Each of the support tubes 14 is connected to the clamping device 13 and one of the joints 20.

Each of the joints 20 is connected to one of the first leg rods 15a and one of the second leg rods 15b.

Each of the link tubes 33 is connected to the positioning seat 30 and one of the joints 20.

The positioning seat 30 has a center recess hole 32 and three channels 31 to receive the corresponding link tube 33.

The clamping device 13 has a transverse through aperture 135, a pair of clamping bars 131, a slot 132, an inner notch 134, and an inner protrusion 133 matching the inner notch 134.

A bolt 136 passes through the transverse through aperture 135 of the clamping device 13.

The clamping device 13 further has three pairs of lug sets 139 to receive the support tubes 14.

A first rivet 141 passes through a through hole 142 of the corresponding support tube 14 to fasten the corresponding support tube 14 and the corresponding lug set 139 together.

Each of the joints 20 has a lower U-shaped mount 23a having a pivot hole 232a and a blocking portion 233, an upper U-shaped mount 23b having a bottom protruded ring 22 and a circular hole 21 to receive the corresponding support tube 14, and the upper U-shaped mount 23b connected to the corresponding link tube 33.

Each of the second leg rods 15b has a top disk 157 having a round aperture 159b and a pair of teeth 158.

Each of the first leg rods 15a has a plurality of serrations 155, a top connector 152 to receive the corresponding top disk 157, and the top connector 152 inserted in the corresponding lower U-shaped mount 23a.

The top connector 152 has a groove 150 and a round hole 159a.

A second rivet 159 fastens the corresponding lower U-shaped mount 23a, the corresponding top connector 152, and the corresponding top disk 157 together.

A nut 161 engages with the second rivet 159.

An inner threaded button 138 engages with the bolt 136.

An inner tube 12 passes through the collar 11.

The inner tube 12 is inserted in the main pipe 10.

Referring to FIG. 5, the second rivet 159 is replaced by a screw 17 and the nut 161 is replaced by a butterfly nut 18.

Figure 6:
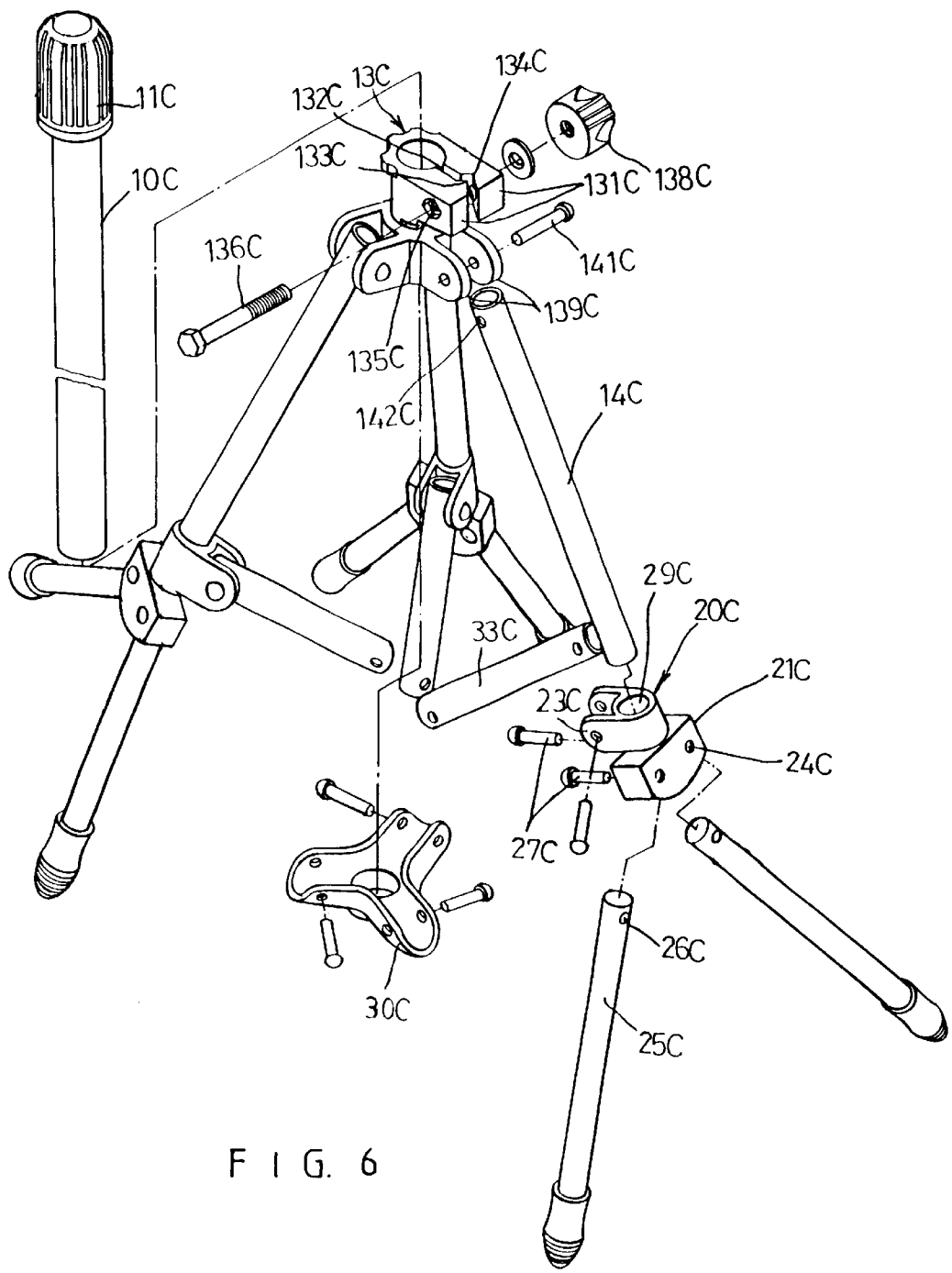
FIG. 6 is a perspective exploded view of a musical instrument stand of a second preferred embodiment in accordance with the present invention.
Figure 8:
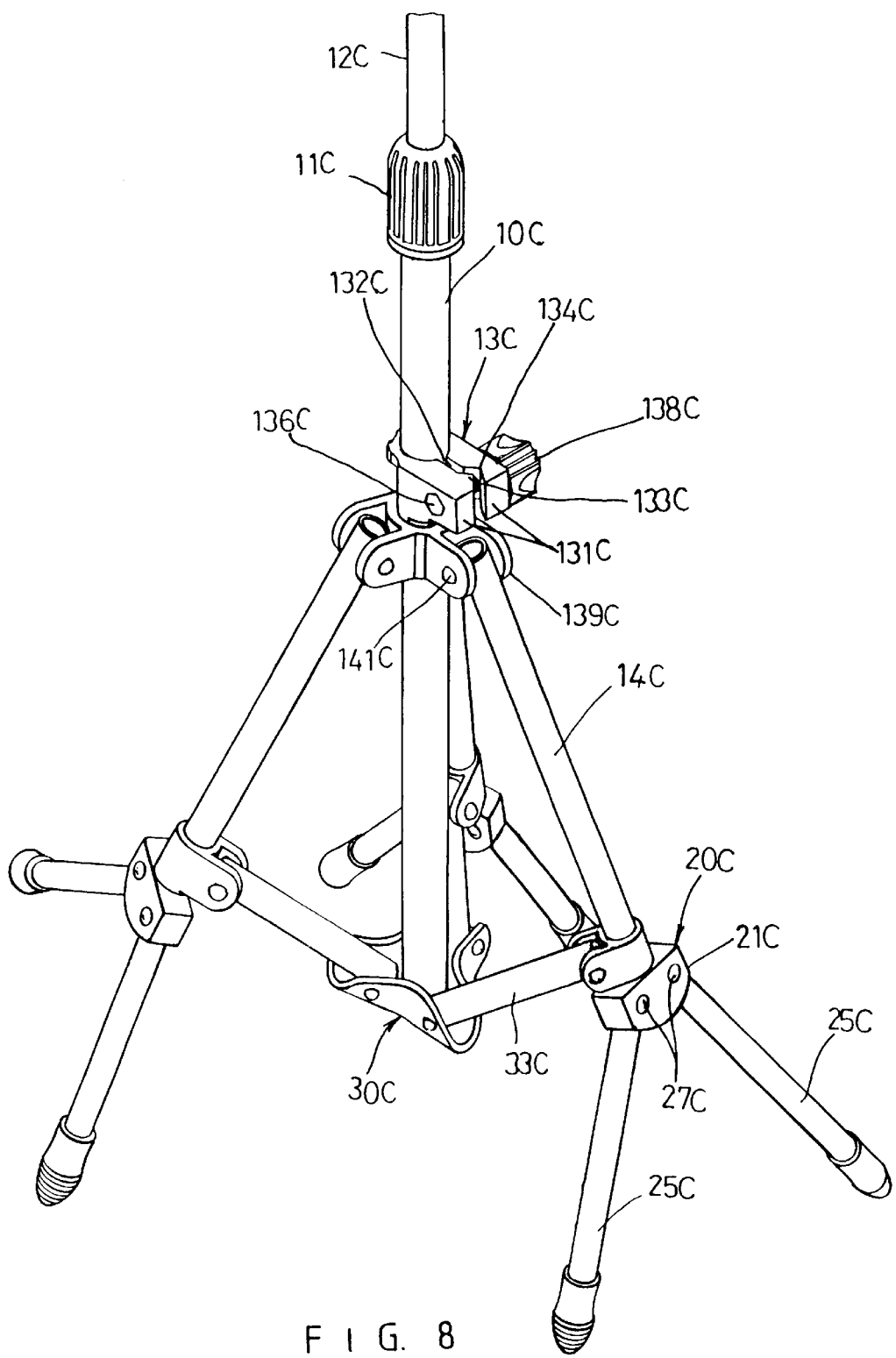
FIG. 8 is a perspective assembly view of a musical instrument stand of a second preferred embodiment in accordance with the present invention.

Referring to FIGS. 6 to 8, a second musical instrument stand comprises three pairs of leg rods 25c, each of the leg rods 25c having a round hole 26c, three link tubes 33c, a positioning seat 30c, three support tubes 14c, three joints 20c, a main pipe 10c, a collar 11c, and a clamping device 13c.

The collar 11c is disposed on a top end of the main pipe 10c.

The main pipe 10c passes through the clamping device 13c.

The positioning seat 30c is disposed on a lower end of the main pipe 10c.

Each of the support tubes 14c is connected to the clamping device 13c and one of the joints 20c.

Each of the joints 20c is connected to two of the leg rods 25c.

Each of the link tubes 33c is connected to the positioning seat 30c and one of the joints 20c.

The clamping device 13c has a transverse through aperture 135c, a pair of clamping bars 131c, a slot 132c, an inner notch 134c, and an inner protrusion 133c matching the inner notch 134c.

A bolt 136c passes through the transverse through aperture 135c of the clamping device 13c.

The clamping device 13c further has three pairs of lug sets 139c to receive the support tubes 14c.

A first rivet 141c passes through a through hole 142c of the corresponding support tube 14c to fasten the corresponding support tube 14c and the corresponding lug set 139c together.

Each of the joints 20c has an upper U-shaped mount 23c having a circular hole 29c to receive the corresponding support tube 14c, and a lower block 21c having a pair of circular apertures 24c, a pair of inner chambers 23c to receive two of the leg rods 25c, a pair of inner recesses 28c, and a lower post 22c.

Two fasteners 27c fasten the lower block 21c and two of the leg rods 25c together.

An inner threaded button 138c engages with the bolt 136c.

An inner tube 12c passes through the collar 11c.

The inner tube 12c is inserted in the main pipe 10c.

The present invention is not limited to the above embodiments but various modification thereof may be made. Furthermore, various changes in form and detail may be made without departing from the scope of the present invention.

I claim:

1. A musical instrument stand comprises:

three pairs of first leg rods, three pairs of second leg rods, three link tubes, a positioning seat, three support tubes, three joints, a main pipe, a collar, and a clamping device, the collar disposed on a top end of the main pipe, the main pipe passing through the clamping device, the positioning seat disposed on a lower end of the main pipe, each of the support tubes connected to the clamping device and one of the joints, each of the joints connected to one of the first leg rods and one of the second leg rods, and each of the link tubes connected to the positioning seat and one of the joints.

2. The musical instrument stand as claimed in claim 1, wherein the positioning seat has a center recess hole and three channels to receive the corresponding link tube.

3. The musical instrument stand as claimed in claim 1, wherein the clamping device has a transverse through aperture, a pair of clamping bars, and a slot.

4. The musical instrument stand as claimed in claim 1, wherein the clamping device has three pairs of lug sets to receive the support tubes.

5. The musical instrument stand as claimed in claim 1, wherein each of the joints has a lower U-shaped mount having a pivot hole and a blocking portion, an upper U-shaped mount having a bottom protruded ring and a circular hole to receive the corresponding support tube, and the upper U-shaped mount connected to the corresponding link tube.

6. The musical instrument stand as claimed in claim 1, wherein each of the second leg rods has a top disk, each of the first leg rods has a top connector to receive the corresponding top disk, and the top connector inserted in the corresponding lower U-shaped mount.

7. The musical instrument stand as claimed in claim 1, wherein each of the joints has an upper U-shaped mount having a circular hole to receive the corresponding support tube, and a lower block having a pair of circular apertures, a pair of inner chambers, a pair of inner recesses, and a lower post.

8. The musical instrument stand as claimed in claim 1, wherein an inner tube passes through the collar, and the inner tube is inserted in the main pipe.

* * * * *